(12) United States Patent
Ide

(10) Patent No.: US 10,754,310 B2
(45) Date of Patent: Aug. 25, 2020

(54) INCORPORATING CHANGE DIAGNOSIS USING PROBABILISTIC TENSOR REGRESSION MODEL FOR IMPROVING PROCESSING OF MATERIALS

(71) Applicant: International Business Machines Corporation, Armonk, NY (US)

(72) Inventor: Tsuyoshi Ide, Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 16/164,138

(22) Filed: Oct. 18, 2018

(65) Prior Publication Data

US 2020/0125044 A1 Apr. 23, 2020

(51) Int. Cl.
*G05B 13/00* (2006.01)
*G06N 3/08* (2006.01)
(Continued)

(52) U.S. Cl.
CPC .......... *G05B 13/048* (2013.01); *G06F 9/542* (2013.01); *G06F 17/18* (2013.01); *G06N 3/08* (2013.01);
(Continued)

(58) Field of Classification Search
CPC ........ G05B 13/048; G05B 2219/45031; G06F 9/542; G06F 17/18; G06N 3/08; H04L 43/0823; G06Q 10/20
See application file for complete search history.

(56) References Cited

U.S. PATENT DOCUMENTS 7,136,825 B2 * 11/2006 Araki ............... G06Q 10/06311
705/7.16
7,689,952 B2 * 3/2010 McConaghy ......... G06F 30/367
716/106
(Continued)

FOREIGN PATENT DOCUMENTS

WO 2017/094267 A1 6/2017

OTHER PUBLICATIONS

Fanaee-T, H., et al., "Tensor-based anomaly detection: An interdisciplinary survey", Knowledge-Based Systems, Received Oct. 12, 2015, Revised Jan. 18, 2016, Accepted Jan. 20, 2016, Available online Feb. 8, 2016, Apr. 15, 2016, pp. 130-147, vol. 98.

(Continued)

*Primary Examiner* — Charles R Kasenge
(74) *Attorney, Agent, or Firm* — Scully, Scott, Murphy & Presser, P.C.; Daniel P. Morris

(57) ABSTRACT

A probability distribution of a manufacturing system's performance conditioned on a training dataset comprising a historical tensor and associated performance metric of a reference period is learned. An input tensor associated with a time window and the input tensor's associated performance metric may be received. The input tensor includes at least multiple sensor variables associated with the manufacturing system and multiple steps of the manufacturing system's manufacturing process. Based on the probability distribution, an overall change is determined between the training dataset's relationship of the historical tensor and associated performance metric, and the relationship of the input tensor and the input tensor's associated performance metric. Based on the probability distribution, contribution of at least one of the multiple variables and the multiple steps to the overall change is determined. An action is automati-
(Continued)

cally triggered in the manufacturing system which reduces the overall change.

17 Claims, 12 Drawing Sheets

(51) Int. Cl.
 *G06F 17/18* (2006.01)
 *G05B 13/04* (2006.01)
 *G06F 9/54* (2006.01)
 *G06Q 10/00* (2012.01)
 *H04L 12/26* (2006.01)

(52) U.S. Cl.
 CPC ......... *G06Q 10/20* (2013.01); *H04L 43/0823* (2013.01); *G05B 2219/45031* (2013.01)

(56) References Cited

U.S. PATENT DOCUMENTS

| | | | |
|---|---|---|---|
| 8,732,627 B2 | 5/2014 | Baseman et al. | |
| 8,738,652 B2 | 5/2014 | Kramer | |
| 9,299,623 B2 | 5/2016 | Baseman et al. | |
| 9,480,583 B2 | 11/2016 | Aksenova et al. | |
| 9,910,938 B2 * | 3/2018 | Morales German | G06F 30/20 |
| 2001/0027406 A1 * | 10/2001 | Araki | G06Q 10/06311 705/7.16 |
| 2006/0053357 A1 * | 3/2006 | Rajski | G01R 31/01 714/742 |
| 2006/0066338 A1 * | 3/2006 | Rajski | G01R 31/01 714/738 |
| 2006/0066339 A1 * | 3/2006 | Rajski | G01R 31/01 324/762.02 |
| 2009/0210183 A1 * | 8/2009 | Rajski | G01R 31/01 702/84 |
| 2013/0346040 A1 * | 12/2013 | Morales German | G06F 30/20 703/2 |
| 2015/0241511 A1 * | 8/2015 | Bickford | H01L 22/10 702/117 |
| 2016/0189079 A1 * | 6/2016 | Gajdzinski | G06Q 10/06393 705/7.37 |
| 2017/0293849 A1 * | 10/2017 | Hodjat | G06N 5/025 |
| 2018/0074874 A1 * | 3/2018 | Bickford | H01L 22/10 |

OTHER PUBLICATIONS

Kang, P., et al., "Virtual metrology for run-to-run control in semiconductor manufacturing", Expert Systems with Applications, Mar. 2011, pp. 2508-2522, vol. 38, Issue 3.

* cited by examiner

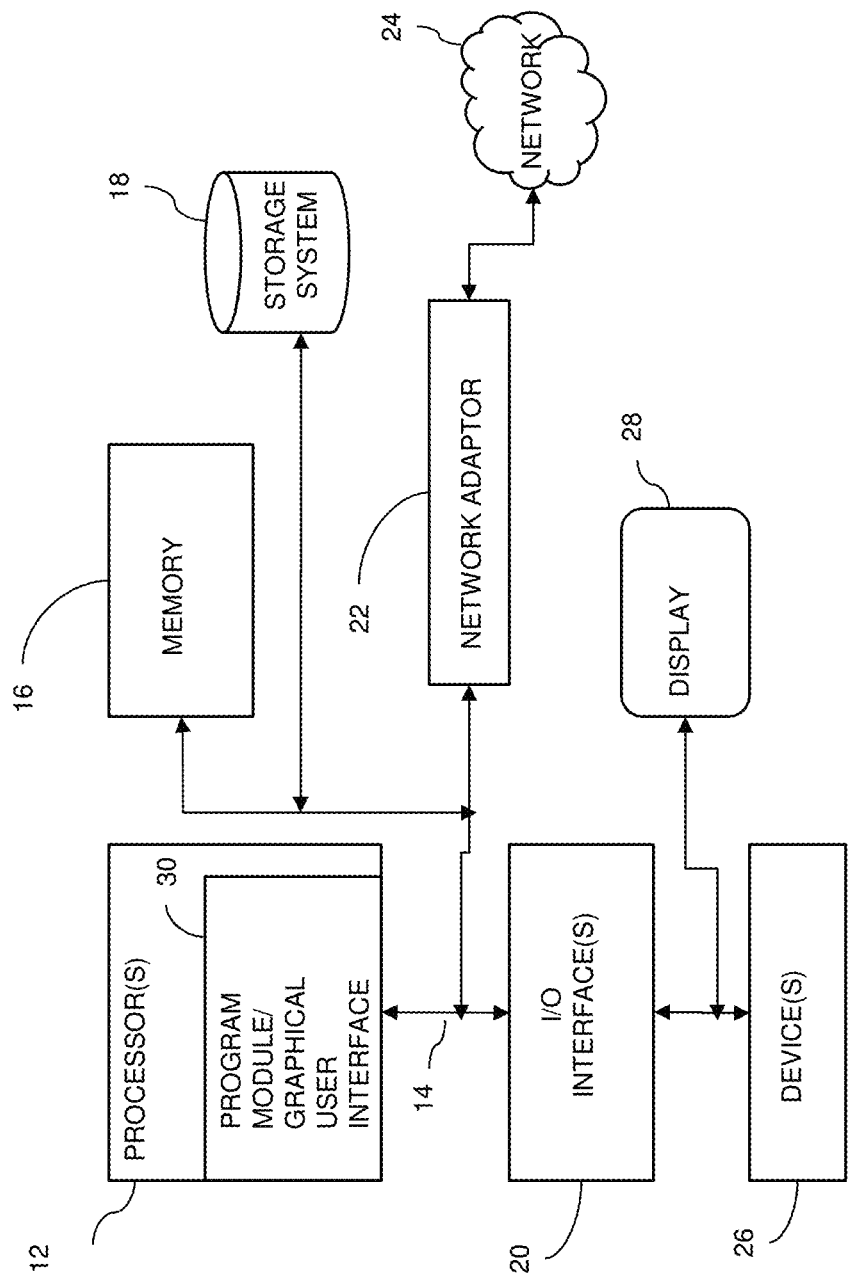

INCORPORATING CHANGE DIAGNOSIS USING PROBABILISTIC TENSOR REGRESSION MODEL FOR IMPROVING PROCESSING OF MATERIALS

BACKGROUND

The present application relates generally to computers and computer applications, and more particularly to anomaly or change detection in manufacturing process or environment equipped with sensors.

Manufacturing systems and equipments deteriorate over time. Predicting equipment or system failure, which for instance may occur as a result of wear and tear degradation, is not a trivial problem. While manufacturing facilities produce sensor data to aid in determining problems and diagnoses, data from such facilities are multidimensional or multi-way. Multi-way array is also referred to as a tensor. Change detection or diagnoses using such multidimensional data is challenging.

A virtual metrology predicts a performance metric as a function of sensor recordings monitoring a manufacturing process. Such virtual metrology methods use a technique called unfolding (or vectorization), which converts an input tensor to a vector. However, using a vector for diagnoses is not easy, for example, because the conversion destroys the original structure of data and produces a very high dimensional vector.

BRIEF SUMMARY

A system and method may be provided which incorporate change diagnosis using probabilistic tensor regression model for improving processing of materials. A system, in one aspect, may include at least one hardware processor coupled with a manufacturing controller receiving sensor data associated with a manufacturing system. A memory device may be coupled with at least one hardware processor. At least one hardware processor may be operable to learn a probability distribution of the manufacturing system's performance conditioned on a training dataset, which includes a historical tensor and associated performance metric of a reference period. At least one hardware processor may receive an input tensor associated with a time window and the input tensor's associated performance metric. The input tensor may include at least multiple sensor variables associated with the manufacturing system and multiple steps of the manufacturing system's manufacturing process. Based on the probability distribution, at least one hardware processor may determine an overall change between the training dataset's relationship of the historical tensor and associated performance metric, and the relationship of the input tensor and the input tensor's associated performance metric. Based on the probability distribution, at least one hardware processor may determine a contribution of at least one of the multiple variables and the multiple steps to the overall change. At least one hardware processor may automatically trigger an action in the manufacturing system which reduces the overall change.

A computer-implemented method, in one aspect, may include learning a probability distribution of a manufacturing system's performance conditioned on a training dataset, which may include a historical tensor and associated performance metric of a reference period. The method may also include receiving an input tensor associated with a time window and the input tensor's associated performance metric, the input tensor may include at least multiple sensor variables associated with the manufacturing system and multiple steps of the manufacturing system's manufacturing process. The method may further include, based on the probability distribution, determining an overall change between the training dataset's relationship of the historical tensor and associated performance metric, and the relationship of the input tensor and the input tensor's associated performance metric. The method may further include, based on the probability distribution, determining a contribution of at least one of the multiple variables and the multiple steps to the overall change. The method may also include automatically triggering an action in the manufacturing system which reduces the overall change.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 13 illustrates a schematic of an example computer or processing system that may implement a system in one embodiment of the present disclosure.

DETAILED DESCRIPTION

A system, method and techniques are presented, which provide a manufacturing tool, for example, a semiconductor manufacturing tool that can predict anomalies in the manufacturing process or equipment, and also can provide or trigger actions that fix the anomalies from occurring. A system, in one aspect, provides for change diagnosis of industrial assets when input data is a tensor (multi-way array) as is often the case in the semiconductor manufacturing. For example, a methodology strives to understand how aging deterioration manifested itself in terms of observed variables so one or more actions can be taken to fine-tune system parameters to compensate such aging degradation.

In one aspect, a computer-implemented module may be provided, which learns a probabilistic tensor regression model from a training dataset. In one embodiment, this computer-implemented module uses a probabilistic tensor regression method, which relies on a mathematical structure of tensor regression.

In another aspect, a computer-implemented module may be provided which computes the anomalousness of a system such as a manufacturing system being monitored and its responsibility factor of individual tensor modes. This computer-implemented module in one embodiment uses the posterior distribution on the mode-decomposed regression coefficients in an information-theoretic fashion for non-subjective scoring.

Figure 1:
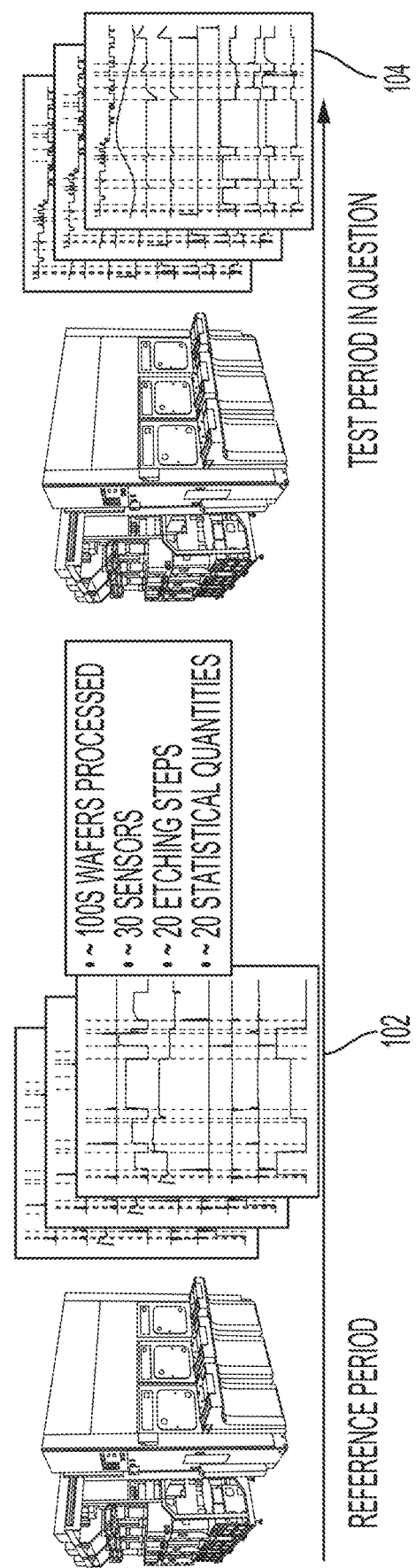
FIG. 1 is a diagram illustrating an example reference period and test period in one embodiment.

In one aspect, a system of the present disclosure may provide for condition-based monitoring of reactive ion etching tool. Tools deteriorate over time, for example, due to debris in the etching chamber or for other reasons. Degradation process may be implicit and subtle and quantification is usually challenging. In general, a methodology of the present disclosure may compare a test period with a reference period to explain the difference between the two periods in terms of observable variables. Data of the test period and the reference period include a tensor, a multi-way array, which may include data of x number of wafers processed (e.g., 100s wafers), y number of sensors (e.g., 30 sensors), z etching steps (e.g., 20 etching steps), w statistical quantities (e.g., 10 statistical quantities). FIG. 1 is a diagram illustrating an example reference period and test period in one embodiment. A tensor of a reference period 102 is associated non-anomalous manufacturing process. A tensor of a test period 104 may be compared with the tensor of the reference period, to detect possible change or anomaly in the test period.

Take for example, a semiconductor etching process. In some embodiments, a relationship between quality measurements (y) and trace data (also referred to as sensor data) is built. Examples of quality measurements may include, but are not limited to, electric resistance, line widths, and others associated with semiconductor etching. Examples of trace data may include, but are not limited to, pressure, temperature, electric current, and/or other associated with the semiconductor etching. In one embodiment, one etching round (iteration) of trace data is represented as a tensor (multi-way array), for example, 2- or 3-way array. An example of a tensor is variable x, etching step x, statistics used x time. Another example is variable x, etching step x, etching metal layer. In some embodiments, etching step and time dimensions can be contracted. For example, 3-way tensor can be summarized as 2-way tensor by, e.g., taking the mean over time in each step.

Figure 2:
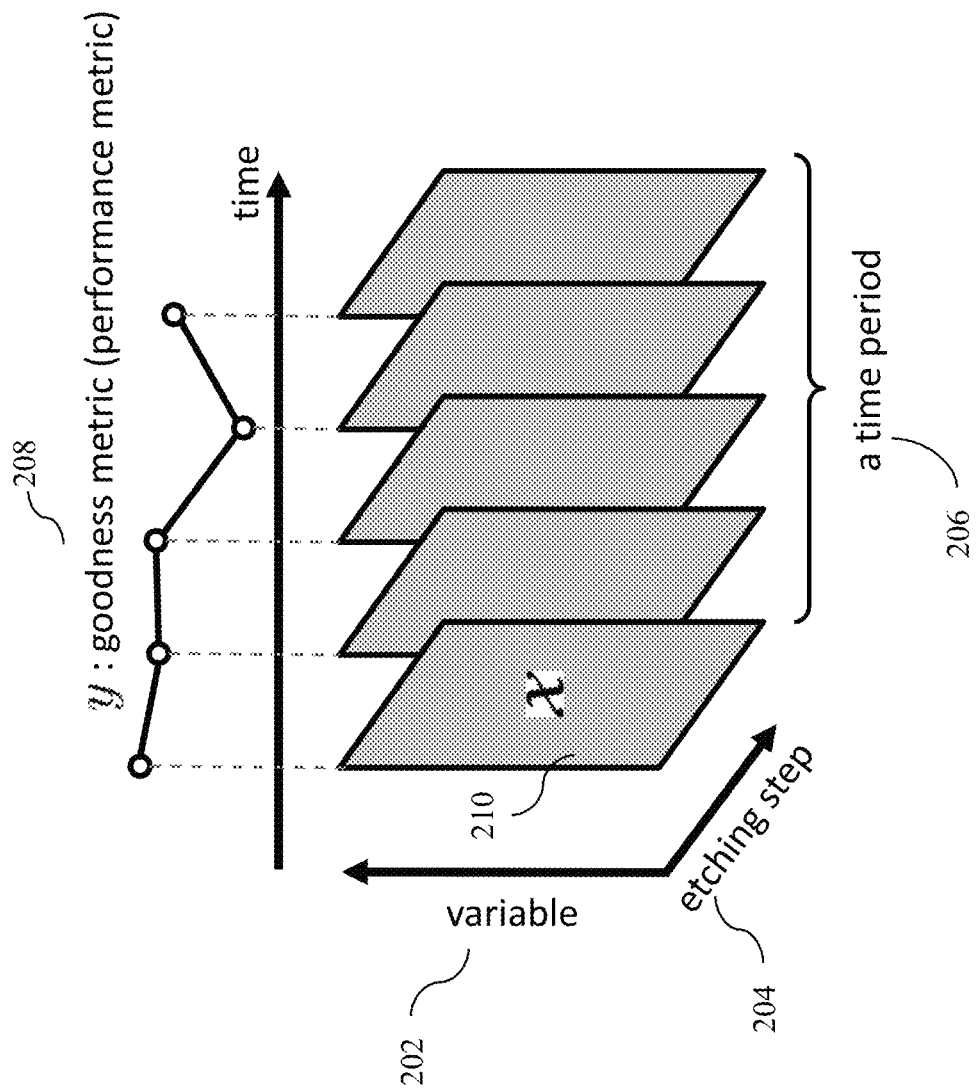
FIG. 2 illustrates a tensor in one embodiment.

FIG. 2 illustrates a tensor in one embodiment. For instance, an etching process may include a variable dimension 202, etching step dimension 204 and time dimension 206. An etching iteration of trace data 210 is associated with goodness metric 208 (also referred to as a performance metric). For instance, referring to an etching process in semiconductor manufacturing, one etching iteration can have many, for example, 20, etching steps (e.g., chemical gas introduction, plasma exposure, and/or others) and each of the steps is monitored with the same set of sensors (e.g., sensors that measure one or more of pressure, temperature, and/or another attribute), resulting in a two-way tensor X as the input. An electric or physical measurement y 208 representing the goodness of semiconductor etching (performance metric) is predicted using or as a function of etching trace data X 210 in a tensor format.

In one aspect, neither y nor X may be constant even under the normal condition due to different production recipes, random fluctuations, aging of the tool, and/or others. After etching, semiconductor wafers are sent to an inspection tool, which gives each of the wafers a scalar y representing the goodness of etching. Generally, a period exhibiting an unusual behavior (such as "time period A") may be compared with a reference period during which everything looked good in shape, in terms of the relationship between X and y. To fine-tune process parameters to compensate gradual aging of the etching tool, an objective metric about how much they are different and how they are different may be provided. In one aspect, the resulting model includes an analytic expression in every inference step while keeping the features such as automatic determination of the regularization parameter. In addition, a change analysis for tensors of the present disclosure may quantify not only the degree of overall change but also the contribution of the individual modes and variables.

A change analysis framework in one embodiment is based on a probabilistic tensor regression, which can be viewed as a Bayesian re-formulation of alternating least squares (ALS). In one embodiment an iterative inference algorithm is derived using a variational expectation-maximization framework. Generally, the present disclosure provides for a Bayesian extension of ALS for tensor regression and information-theoretic tensorial change analysis using probabilistic tensor regression.

Figure 3:
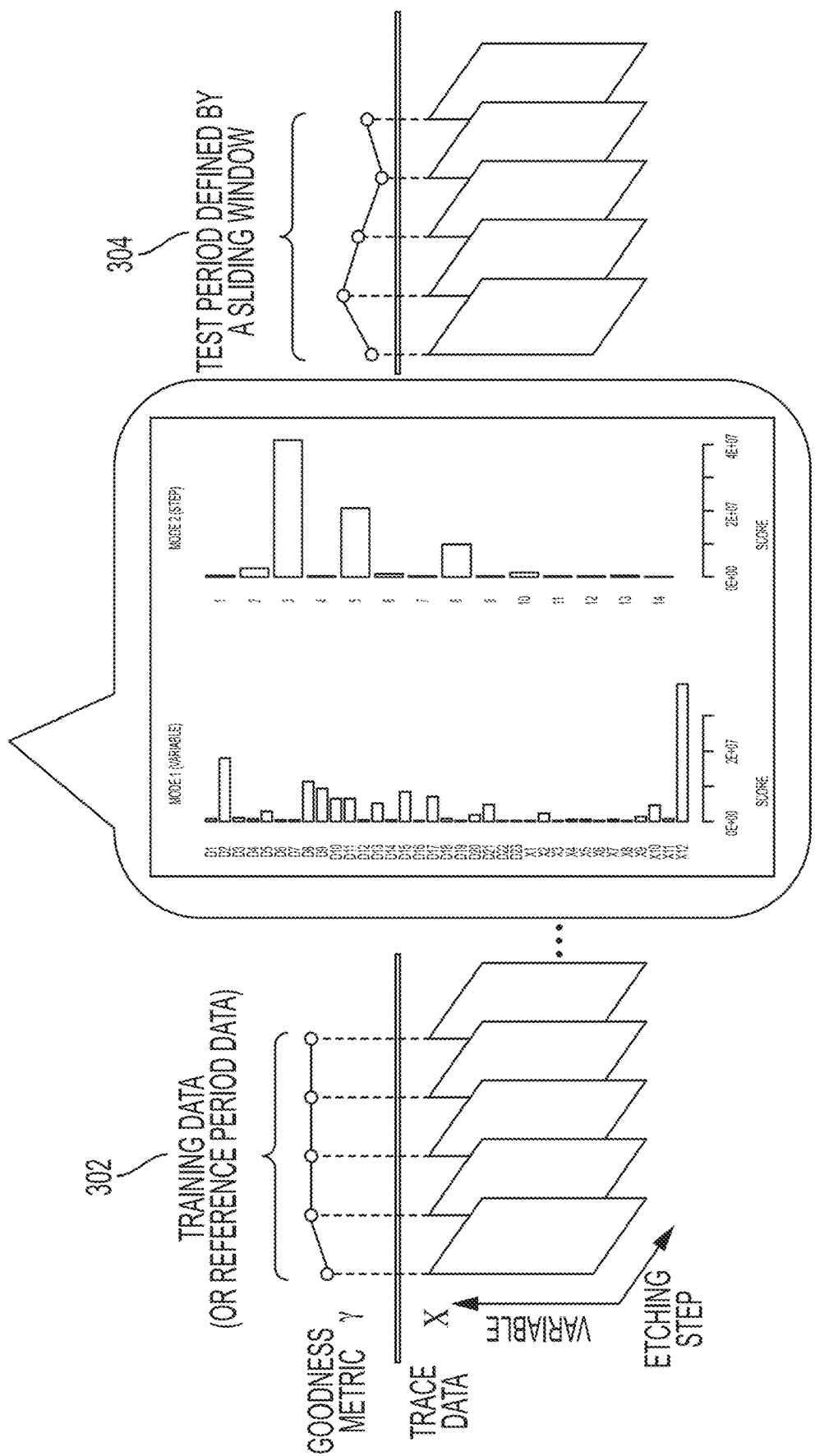
FIG. 3 illustrates training data and test data observed during period of times in one embodiment.

A system and method of the present disclosure in embodiments may detect a change in such x-y relationship and explain which mode or dimension is most responsible for the detected change. Identifying the dimension attributable to the change may allow for efficiently addressing an anomaly occurring in a manufacturing process. FIG. 3 illustrates training data and test data observed during period of times in one embodiment. Training data (also referred to as reference data) includes data observed during a period of time, in which a manufacturing process performed normally, for example, no anomaly or nearly no anomaly detected during the process. A relationship between goodness metric y (or quality measurements y) and trace data X may be built or identified for that period of time. A test period 304 may be defined as another period of time. A test period 304 may be defined by a sliding window of time.

In some aspects, data generally is noisy and different periods produce different values. Computing a simple distance such as $\|X-X'\|_F^2$ may not be informative. In one aspect, differences that affect the performance metrics are considered. For instance, random fluctuations which do not significantly change (e.g., significance determined based on a threshold value) the goodness metric y may be discarded. In one aspect, a probabilistic treatment of the present disclosure in one embodiment allows for quantifying the uncertainty in the X-y relationship.

Regression learns a function y=f(X) from training data. However, tensor regression has not been well-studied. Existing techniques mostly use vectorization of tensors. In one aspect, probabilistic prediction is even more difficult. Non-subjective change scoring requires probabilistic prediction. However, existing probabilistic tensor regression methods may not be practical, requiring prohibitively high computational cost. A vectorized probabilistic model may not be interpretable because the tensor structure may have been destroyed during the vectorization.

Figure 4:
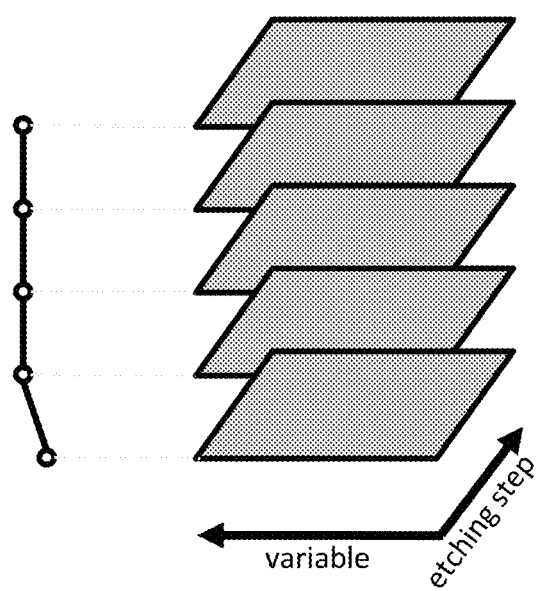
FIG. 4 shows a goodness metric y in relation to X in one embodiment.

A computer-implemented system and method in embodiments builds or learns a probabilistic tensor regression model. A method, for example, learns p(y|X, $D_{tr}$, a probability distribution of y (goodness or performance) conditioned on an input tensor X and training data $D_{tr}$. FIG. 4 shows a goodness metric y in relation to X in one embodiment. In one aspect, probabilistic inference can be done when: an observation model is Gauss-linear $$p(y \mid X, A, \lambda) = N(y \mid (A, X), \lambda^{-1}),$$

$$(X, A) \equiv \sum_{i_1, \ldots, i_M} X_{i_1, \ldots, i_M} A_{i_1, \ldots, i_M}.$$

Coefficients are in Canonical Polyadic (CP) Expansion $$A = \sum_{r=1}^{R} a^{1,r} \circ a^{2,r} \circ \ldots \circ a^{M,r}.$$

In some embodiments, prior distribution is Gauss-gamma (or its variant) and inference is based on a variational expectation-maximization (EM) approach.

A method to learn $p(y|X, D_{tr})$ preserves the tensor structure, may not require expensive computation on testing, for instance, so that processors execute faster. Unlike other methods, the method to learn $p(y|X, D_{tr})$ in one embodiment does not require Monte Carlo (MC) sampling on training.

Figure 5:
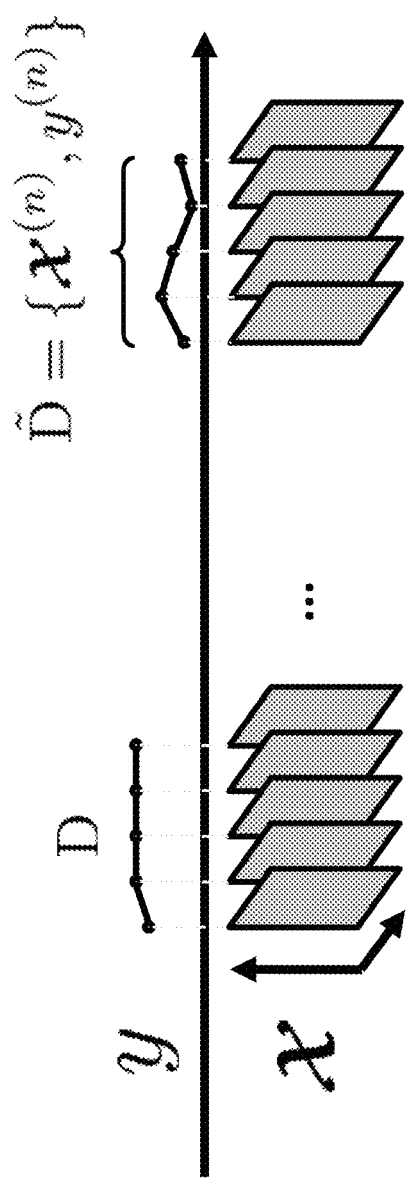
FIG. 5 illustrates D and D~ in one embodiment.

In some embodiments, based on the derived posterior distributions, e.g., learned $p(y|X, D_{tr})$, a change analysis may be provided. For example, a change analysis may include computing types of quantities: e.g., (1) a metric to quantify the overall change of two periods D and D~; (2) a set of metrics to quantify the contribution of the individual variables and dimensions to the change between D and D~. FIG. 5 illustrates D and D~ in one embodiment.

In some embodiments, a metric to quantify the overall change of two periods D and D~ may be computed as follows. Predictive distribution derived in $p(y|X, D_{tr})$ may be used for the overall change score as negative information (or log-loss). In one embodiment, the overall change c(D̃,D) is computed as follows:

$$c(\tilde{D}, D) = \frac{1}{2\tilde{N}} \sum_{n \in \tilde{D}} \left[ \frac{\{y^{(n)} - \mu(X^{(n)})\}^2}{\sigma^2(X^{(n)})} + \ln\{2\pi\sigma^2(X^{(n)})\} \right]$$

where D̃ is test data;
$X^{(n)}$ is n-th trace data of test data;
$y^{(n)}$ is n-th output of test data;
$\mu(X)$ is predictive mean; and
$\sigma^2(X)$ is predictive variance.

In some embodiments, a set of metrics to quantify the contribution of individual variables and dimensions to the change between D and D~ is computed as follows. The computation may use the posterior distribution for the CP-decomposed regression coefficients derived in the $p(y|X, D_{tr})$ model. For the l-th mode and r-th rank, $q_1^{l,r}(a^{l,r}) = N(a^{l,r}|\mu^{l,r}, \Sigma^{l,r})$ use the Kullback-Leibler divergence between two models (reference versus testing (with tilde)) for the responsibility of the l-th mode and r-th rank $$c_i^l(\tilde{D}, D) \equiv \frac{1}{R} \sum_{r=1}^{R} \int da^{l,r} q_1^{l,r}(a^{l,r}) \ln \frac{q_1^{l,r}(a_i^{l,r} \mid a_{-i}^{l,r})}{\tilde{q}_1^{l,r}(a_i^{l,r} \mid a_{-i}^{l,r})}$$

$$= \frac{1}{2R} \sum_{r=1}^{R} \left\{ \frac{\left[\tilde{\Lambda}^{l,r}(\tilde{\mu}^{l,r} - \mu^{l,r})\right]_i^2}{\tilde{\Lambda}_{i,i}^{l,r}} + \ln \frac{\Lambda_{i,i}^{l,r}}{\tilde{\Lambda}_{i,i}^{l,r}} + \frac{\left[\tilde{\Lambda}^{l,r} \sum^{l,r} \tilde{\Lambda}^{l,r}\right]_{i,i}}{\tilde{\Lambda}_{i,i}^{l,r}} - 1 \right\}$$

Figure 6:
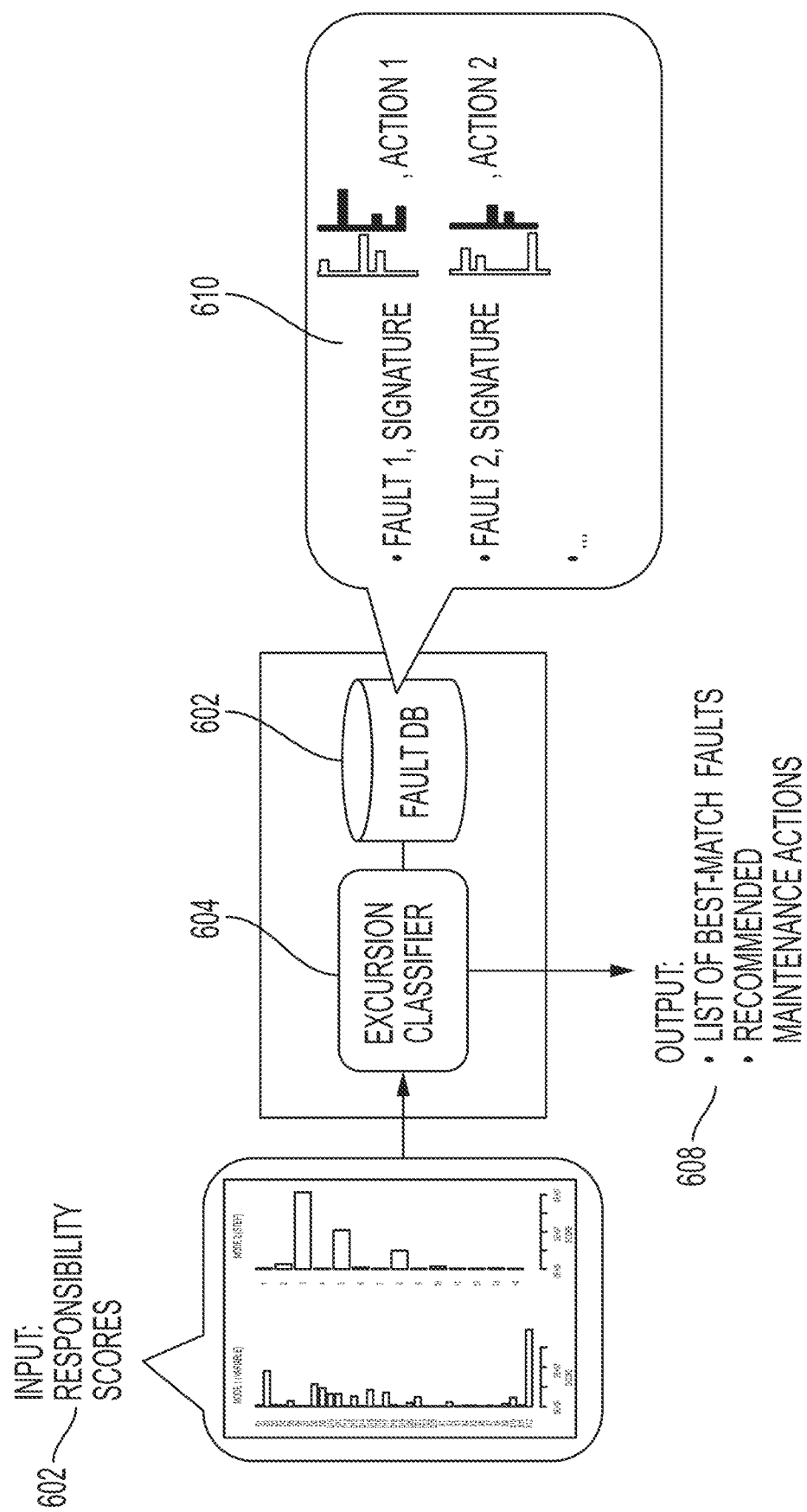
FIG. 6 is a diagram illustrating an excursion classifier and a fault database (DB) in one embodiment.

In some embodiments, based on the responsibility scores, for example, identified l-th mode and r-th rank as a signature, a maintenance action may be recommended and triggered (or executed) automatically. FIG. 6 is a diagram illustrating an excursion classifier and a fault database (DB) in one embodiment. A responsibility score 606 is a set of histograms, which can be viewed as the signature of faults. There may be M histograms for a mode-M tensor input (e.g., two histograms for a matrix input). This system features a fault database (DB) 602 and an excursion classifier 604. The fault DB 602 stores a list of known faults, each of which is associated with a maintenance action such as feed cleaning wafers to collect unwanted particles in the chamber, perform plasma cleaning with oxygen or fluoric gas, and fine-tune the manufacturing recipe in a specific way. Given a responsibility score 606, the system outputs a list of best-match faults and recommended maintenance actions 608.

In one embodiment, an entry of the fault DB is a tuple 610 comprising fault identifier (ID), reference signature, and maintenance action(s). A reference signature can be a histogram set that represents typical score distribution for the fault. An excursion classifier computes the similarity or dissimilarity of faults with respect to one another and returns the most similar fault(s). Dissimilarity can be computed by, e.g., the L1 distance between the histograms. In some embodiments, the following computation determines the similarity or dissimilarity of fault(s):

$$d_k = \sum_{l,i} |c_i^l - c_i^{-l}(k)|$$

where,
$d_k$: Dissimilarity with respect to the k-th fault;
$c_i^l$: Computed responsibility score of the i-th variable of the l-th mode;
$c_i^{-l}(k)$: Reference value of the k-th fault on the i-th variable of the l-th mode.

If a reference signature is difficult to obtain, vector-based classifiers such as support vector machine (SVM) can be used for fault classification. Maintenance action or actions can be recommended or automatically triggered based on the identified fault classification.

Figure 7:
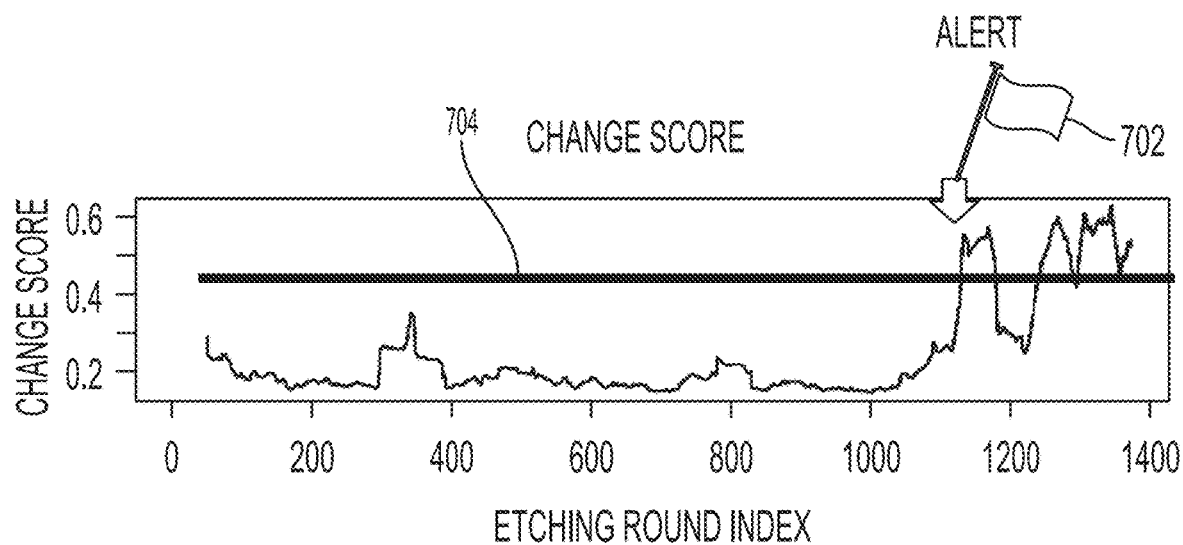
FIG. 7 shows a graph of change score in etching iterations in one embodiment.
Figure 8:
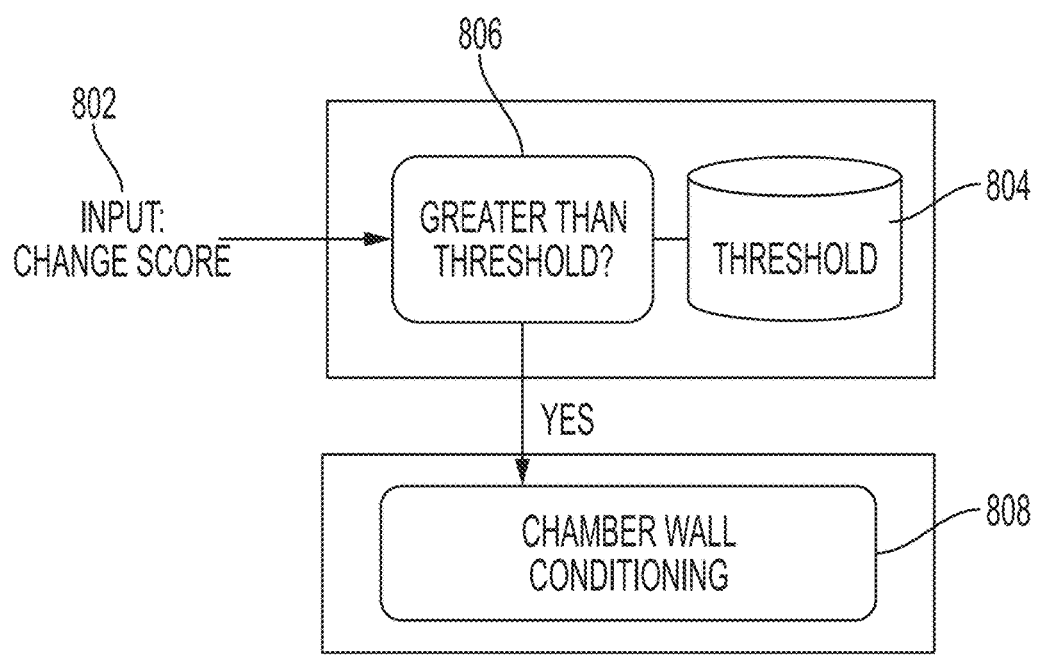
FIG. 8 is a block diagram showing automatic triggering of an action in one embodiment.

In another aspect, an overall change score or the responsibility scores can be used for online tool monitoring. FIG. 7 shows a graph of change score in etching iterations in one embodiment. An alert flag 702 can be raised when the overall score exceeds a threshold 704. The threshold 704 can be determined by the score distribution of a reference period by fitting, e.g., the chi-squared distribution in one embodiment. In one aspect, the flag can automatically trigger a generic maintenance action (e.g., without performing fault classification) such as chamber wall conditioning with fluorine-based plasmas. FIG. 8 is a block diagram showing automatic triggering of an action in one embodiment. Input change score 802 is compared to a threshold value 804 at 806, and responsive to determining that the input change score 802 is greater than the threshold, an action 808 is automatically triggered to be performed. For instance, a controller automatically starts the action. An example of an action is chamber wall conditioning, as shown at 808, but not limited to such.

Figure 9:
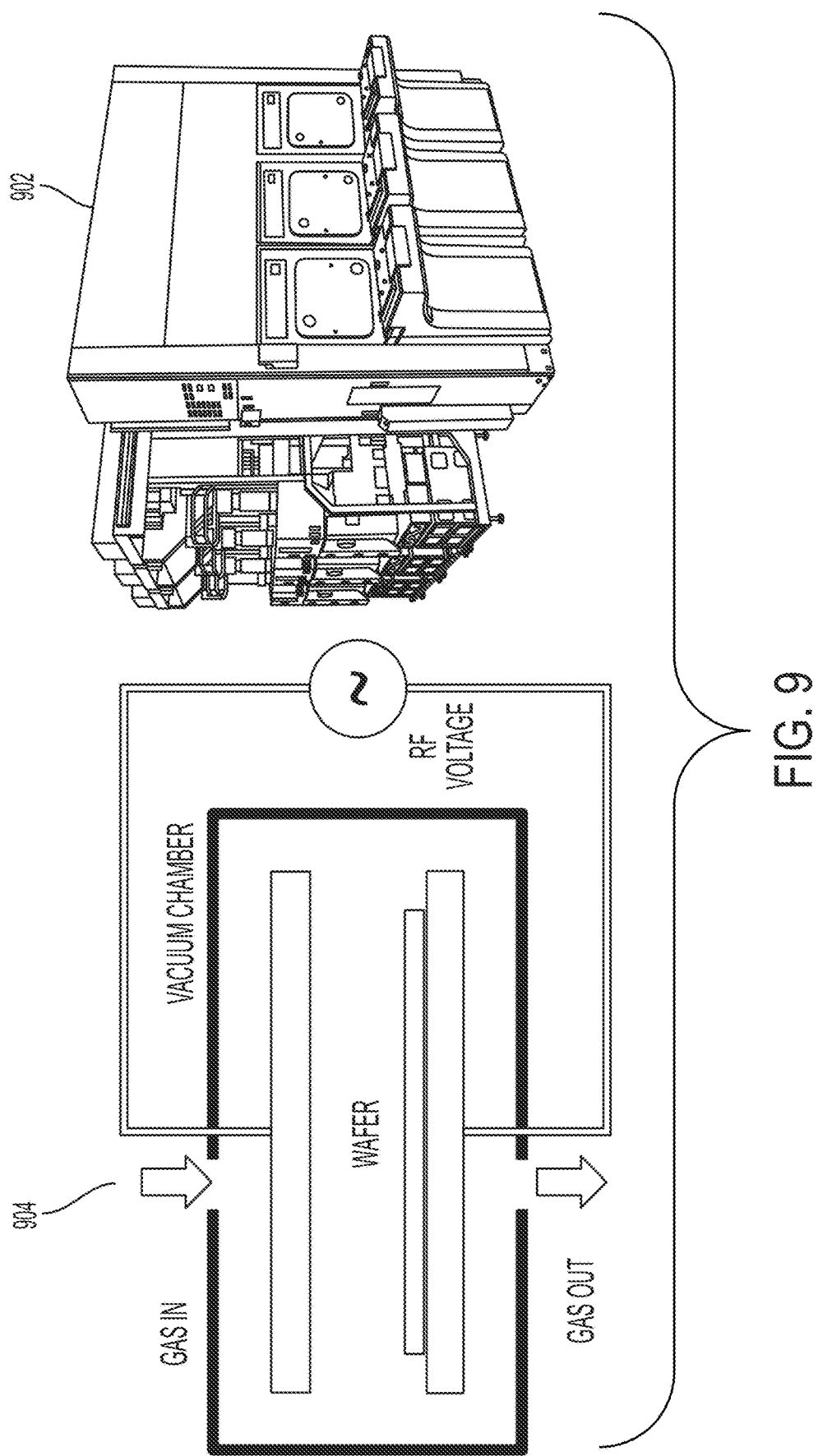
FIG. 9 illustrates monitoring of semiconductor manufacturing in one embodiment.

FIG. 9 illustrates monitoring of semiconductor manufacturing in one embodiment. In an example use case, a semiconductor manufacturing tool executing on a computer or controller 902 in one embodiment may monitor a reactive ion etching tool 904, for example, observe y and X. y may be observed to endpoint time. X, a tensor, may include data from multiple different sensors and multiple different etching steps, for instance, 35 different sensors and 14 different etching steps. The semiconductor manufacturing tool may learn the probabilistic tensor regression model using a training dataset. As an example, a training dataset may contain about 1000 etching iterations. A test dataset may include data with anomaly (excursion event) whose root cause is not known, and for example, may include a number of etching iterations (e.g., 1372) in total with an excursion event toward the end. Using the methodology described above, the semiconductor manufacturing tool may compute the anomalousness score and its responsibility score.

Figure 10B:
FIGS. 10A and 10B show example sensor data in one embodiment.
Figure 10A:
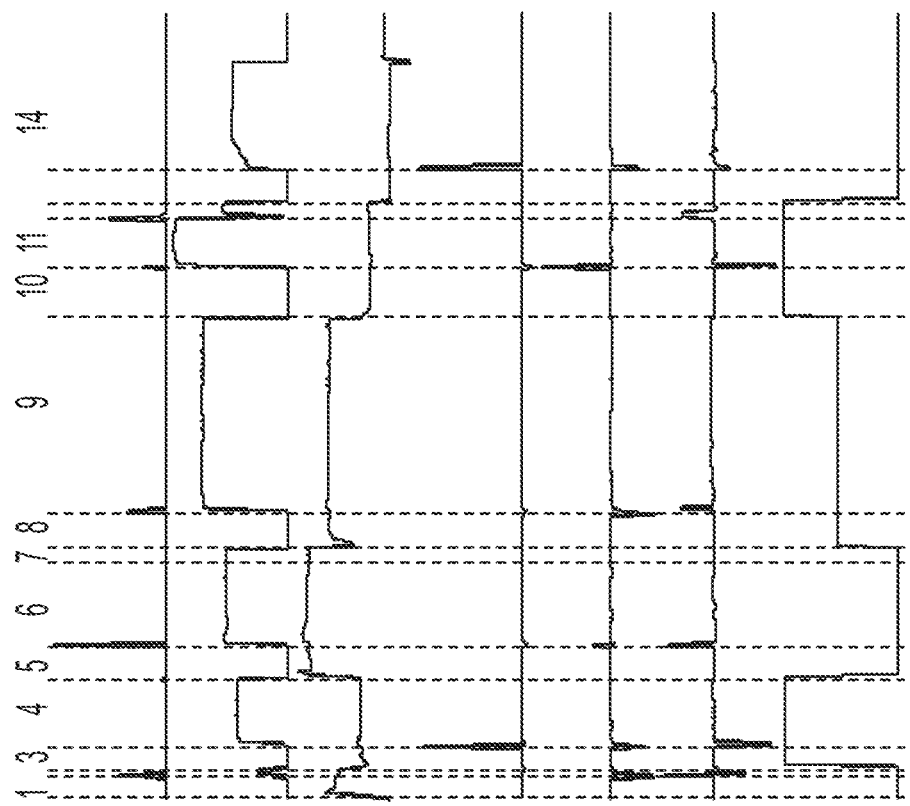

For example, in plasma ion etching, the etching chamber is monitored with various sensors to measure the flow rate of specific reactive gases, temperatures, pressures, voltages, photoemission intensity from plasma, as shown in FIG. 9's schematic. In addition to passively monitored variables, there may be other variables controlled by given set points. FIGS. 10A and 10B show an example of sensor data. As shown, one etching process includes several steps, which correspond to distinctive physical processes such as introducing chemical gases, applying radio-frequency (RF) current, ventilation, and/or others. The target variable y is a real-valued quality metric such as the mean electric resistance over a region on a semiconductor wafer. FIG. 10A shows an example of etching data from non-controlled sensors and FIG. 10B shows controlled physical quantities. One etching iteration in this example case includes 14 steps as shown in the figure. In one aspect, although this is time-series data in nature, the recordings of each sensor is represented by its mean in each step.

In an example run of a semiconductor manufacturing tool incorporating the methodologies of the present disclosure, the change score computed by the semiconductor manufacturing tool detected an excursion event, for example, by identifying a significantly increased score toward the end of a test period. An outlier score was identified in a single etching iteration, and a change score was identified in higher number, e.g., 50 sample average. The responsibility score showed that a particular variable (e.g., 'x12') and a particular etching step (e.g., 'step 3') played a significant role in this change. In one aspect, prior number of samples in a prior time window (e.g., the last 400 samples) may be used to train another probabilistic regression model. An unusual increase in the particular variance, for example, in 'x12' at 'step 3' was found or identified, which increase may have been overlooked by other existing tools.

In embodiments, the system and method of the present disclosure present change detection and analysis using tensor regression. For example, the change detection detects changes in the relationship between the input tensor and the output scalar; change analysis computes the responsibility score of individual tensor modes and dimensions for the detected change. In one aspect, a probabilistic tensor regression method of the present disclosure can be viewed as a probabilistic generalization of the alternating least squares algorithm. Via the probabilistic formulation, the derived change scores can have a clear information-theoretic interpretation. In some embodiments, such change detection and change analysis is integrated in a semiconductor manufacturing facility and detects anomaly and responsible variable associated with the anomaly in a semiconductor manufacturing facility. In other embodiments, such change detection and change analysis may be integrated in another industrial process.

Change detection in temporal data representing a process has a variety of applications across many industries. Depending on the specific type of data and changes expected, a number of different machine learning tasks can be defined and run on a processor. A change detection in a supervised setting may have a goal to detect a change in the relationship between the input and output variables. By analyzing the nature of the detected change in terms of controllable input variables, actionable insights into the system can be obtained.

In describing the detailed embodiments, the present disclosure denotes (column) vectors, matrices, and tensors by bold italic (x, etc.), sanserif (A, etc.), and bold calligraphic (X, etc.) letters, respectively. The elements of (column) vectors, matrices, and tensors are generally denoted by corresponding non-bold letters with a subscript ($x_1$, $A_{i,j}$, $X_{i_1,\ldots,i_M}$, etc.). The present disclosure may also use [•] as the operator to select a specific element ($[w]_i \equiv w_i$, etc.), with being used to define the left hand side (l.h.s.) by the right hand side (r.h.s.). To simplify the notation, the present disclosure may use non-italic bold letters to collectively represent the indexes of the M modes as $i=(i_1, \ldots, i_M)$. Superscripts are used to distinguish the tensor modes such as $a^l$.

The inner product of two same-sized tensors X, A $\in$ $R^{d_1 \times \cdots \times d_M}$ is defined as $$(X, A) \equiv \sum_{i_1,\ldots,i_M} X_{i_1,\ldots,i_M} A_{i_1,\ldots,i_M}. \tag{1}$$

The outer product between vectors is an operation to create a tensor from a set of vectors. For example, the outer product of $a^1 \in R^{d_1}$, $a^2 \in R^{d_2}$, $a^3 \in R^{d_3}$ makes a 3-mode tensor of $d_1 \times d_2 \times d_3$ dimension as $$[a^1 \circ a^2 \circ a^3]_{i_1,i_2,i_3} = a_{i_1}^1 a_{i_2}^2 a_{i_3}^3. \tag{2}$$

The inner product between a tensor and a rank-1 tensor plays a major role in this paper. For example, $$(X, a^1 \circ \ldots \circ a^M) = \sum_{i_1,\ldots,i_M} X_{i_1,\ldots,i_M} a_{i_1}^1 \ldots a_{i_M}^M. \tag{3}$$

This can be viewed as a "convolution" of a tensor by a set of vectors. The m-mode product is an operation to convolute a tensor with a matrix as $$[X \times_m S]_{i_1,\ldots,j_m,\ldots,i_M} \equiv \sum_{i_m=1}^{d_m} X_{i_1,\ldots,i_m,\ldots,i_M} S_{j_m,i_m}. \tag{4}$$

Tensorial Change Analysis Framework

The following section summarizes the problem setting and tensorial change detection framework at a high level in one embodiment.

Problem Setting

Given are a training dataset D including N pairs of a scalar target variable y and an input tensor X:

$$D=\{(y^{(n)}, X^{(n)}) | n=1, \ldots, N\} \quad (5)$$

where the superscript in the round parenthesis is used to denote the n-th sample. Both the input tensor and the target variable are assumed to be centered. $X^{(n)}$'s have M modes in which the l-th mode has $d_l$ dimensions.

In one aspect, the present disclosure assumes a linear relationship as y:(A, X), in which the coefficient tensor follows the CP expansion of order R:

$$A = \sum_{r=1}^{R} a^{1,r} \circ a^{2,r} \circ \ldots \circ a^{M,r}. \quad (6)$$

Using a probabilistic model described in the next subsection, a first goal is to obtain the predictive distribution p(y|X, D) for an unseen sample X, based on the posterior distribution for $\{a^{r,l}\}$ and the other model parameters learned from the training data.

Change Analysis Scores

The present disclosure may give the definition of change scores for three sub-tasks in tensorial change analysis: Outlier detection, change detection, and change analysis.

First, the outlier score is defined for a single pair of observation (y, X) to quantify how much uncommon they are in reference to the training data. Given the predictive distribution p(y|X, D), the present disclosure defines the outlier score as the logarithmic loss:

$$c(y, X) \equiv -\ln p(y | X, D) = \frac{\{y - \mu(X)\}^2}{2\sigma^2(X)} + \frac{1}{2}\ln\{2\pi\sigma^2(X)\}, \quad (7)$$

where the second line follows from the explicit from of p(y|X, D) given later (Eq. (39)).

Second, the present disclosure may define the change detection score by averaging the outlier score over a set $\tilde{D}$:

$$c(\tilde{D}, D) = \frac{1}{\tilde{N}} \sum_{n \in \tilde{D}} c(y^{(n)}, X^{(n)}), \quad (8)$$

where $\tilde{N}$ is the sample size of $\tilde{D}$. The set $\tilde{D}$ is generally defined using a sliding window for temporal change detection.

Third, for change analysis, the present disclosure may leverage the posterior distribution of the CP-decomposed regression coefficient $\{a^{l,r}\}$. As shown in the next section, the posterior distribution, denoted as $q_1^{l,r}(a^{l,r})$, is given by a Gaussian distribution:

$$q_1^{l,r}(a^{l,r}) = N(a^{l,r}|\mu^{l,r}, \Sigma^{l,r}), \quad (9)$$

where the first and second arguments after the bar represents the mean and the covariance matrix, respectively. In some embodiments, the goal of change analysis is to quantify the contribution of each tensorial mode to the distributional difference between two datasets, e.g., D, $\tilde{D}$. For the (l,r)-mode, this can be calculated as the Kullback-Leibler (KL) divergence of $q_1^{l,r}(a_i^{l,r}|a_{-i}^{l,r})$, the conditional distribution for the i-th dimension given the rest:

$$c_i^l(\tilde{D}, D) \equiv \frac{1}{R} \sum_{r=1}^{R} \int da^{l,r} q_1^{l,r}(a^{l,r}) \ln \frac{q_1^{l,r}(a_i^{l,r}|a_{-i}^{l,r})}{\tilde{q}_1^{l,r}(a_i^{l,r}|a_{-i}^{l,r})} = $$

$$\frac{1}{2R} \sum_{r=1}^{R} \left\{ \frac{[\tilde{\Lambda}^{l,r}(\tilde{\mu}^{l,r} - \mu^{l,r})]_i^2}{\tilde{\Lambda}_{i,i}^{l,r}} + \ln \frac{\Lambda_{i,i}^{l,r}}{\tilde{\Lambda}_{i,i}^{l,r}} + \frac{[\tilde{\Lambda}^{l,r}\sum^{l,r}\tilde{\Lambda}^{l,r}]_{i,i}}{\tilde{\Lambda}_{i,i}^{l,r}} - 1 \right\} \quad (10)$$

where the tilde specifies the model learned on $\tilde{D}$ and $\Lambda^{l,r} = (\Sigma^{l,r})^{-1}$, whose explicit form is given later (see Eq. (22)).

The above definitions have the capability of producing probabilistic output. Also, they can be straightforwardly computed without any expensive computations such as tensor factorization and MC sampling.

Probabilistic Model for Tensor Regression

The following section derives the inference algorithm of the proposed probabilistic tensor regression model.

Observation Model and Priors

In some embodiments, a probabilistic tensor regression model includes two primary ingredients: an observation model to describe measurement noise and a prior distribution to represent the uncertainty of regression coefficients.

First, the observation model is defined as $$p(y|X, A, \lambda) = N(y|(A, X), \lambda^{-1}), \quad (11)$$

where $N(y|\cdot, \cdot)$ denotes the univariate Gaussian distribution with the mean (A,X) and the precision $\lambda$.

Second, for the prior distribution of the coefficient vectors $a^{l,r}$, the present disclosure may use the Gauss-gamma distribution as $$p(\{a^{l,r}\}) = \prod_{l=1}^{M} \prod_{r=1}^{R} N(a^{l,r} | 0, (b^{l,r})^{-1} I_{d_l}), \quad (12)$$

$$p(b^{l,r} | \alpha_0, \beta_0) = \frac{\beta_0^{\alpha_0}}{\Gamma(\alpha_0)}(b^{l,r})^{\alpha_0 - 1} e^{-\beta_0 b^{l,r}} \quad (13)$$

where $I_{d_l}$ is the $d_l$-dimensional identity matrix and $\Gamma(\cdot)$ is the gamma function. The hyper-parameters $a_0, \beta_0$ are assumed to be given. In some embodiments, the parameter $\lambda$ is determined as part of learning and there is no need for cross-validation. This is one of the advantages of probabilistic formulation and is in contrast to the existing frequentist tensor regression work.

Variational Inference Strategy

For model inference, the present disclosure may employ the variational expectation-maximization (vEM) framework. vEM integrates point-estimation into the variational Bayes (VB) method. Specifically, the variational E (VE) step finds the posterior distribution of $\{a^{r,l}, b^{r,l}\}$ in the same way as VB, given the latest point-estimated parameters. Then, given the posterior just estimated, the variational M (VM) step point-estimates the parameters A by maximizing the posterior expectation of the log complete likelihood. The log complete likelihood of the model in one embodiment is as follows:

$$L(A, b, \lambda) = c. + \frac{1}{2}\sum_{n=1}^{N}\{\ln\lambda - \lambda\Delta(y^{(n)}, X^{(n)})^2\} + \quad (14)$$
$$\sum_{l=1}^{M}\sum_{r=1}^{R}\left\{\frac{1}{2}d_l\ln b^{l,r} - \frac{1}{2}b^{l,r}\text{Pa}^{l,r}P_2^2\right\} + \sum_{l=1}^{M}\sum_{r=1}^{R}\{(\alpha_0 - 1)\ln b^{l,r} - \beta_0 b^{l,r}\},$$

where c. is a symbolic notation for an unimportant constant, $P \cdot P_2$ is the 2-norm, and b is a shorthand notation for $\{b^{r,l}\}$. The present disclosure also defined $$\Delta(y, X) \equiv y - \sum_{r=1}^{R}(X, a^{1,r} \circ \ldots \circ a^{M,r}), \quad (15)$$

where the dependency on A on the left hand side (l.h.s.) is omitted for simplicity.

VE Step: Posterior for Coefficient Vectors
The VB step finds an approximated posterior in a factorized form. In some embodiments, the present disclosure may seek a VB posterior in the form $$Q(\{a^{l,r}, b^{l,r}\}) = \prod_{l=1}^{M}\prod_{r=1}^{R}q_1^{l,r}(a^{l,r})q_2^{l,r}(b^{l,r}). \quad (16)$$

The distributions $q_1^{l,r}$, $q_2^{l,r}$ are determined so that they minimize the KL divergence from the true posterior. The true posterior is proportional to the complete likelihood by Bayes' rule. Thus, the KL divergence is represented as $$KL = c. + \langle \ln Q \rangle - \langle L(A,b,\lambda) \rangle,$$

where $\langle \cdot \rangle$ represents the expectation with respect to Q. Here the unknowns are not variables but functions. However, according to calculus of variations, roughly speaking, the present disclosure can formally take the derivative with respect to $q_1^{l,r}$ or $q_2^{l,r}$ and equate the derivatives to zero. In that way, the condition of optimality is given by $$VE \text{ step: } \ln q_1^{l,r}(a^{l,r}) = c. + \langle L(A,b,\lambda) \rangle_{\backslash a^{l,r}}, \quad (17)$$

$$\ln q_2^{l,r}(b^{l,r}) = c. + \langle L(A,b,\lambda) \rangle_{\backslash b^{l,r}}, \quad (18)$$

where $\langle \cdot \rangle_{\backslash a^{l,r}}$ and $\langle \cdot \rangle_{\backslash b^{l,r}}$ denotes the expectation with $Q|q_i^{l,r}$ and $Q|q_2^{l,r}$, respectively.

The following illustrates solving the first equation. Unlike the case of single-mode vector-based regression, $L(A, b, \lambda)$ has a complex nonlinear dependency on $\{a^{l,r}\}$, especially in the term of $\Delta^2$. However, to compute $\langle \cdot \rangle_{\backslash a^{l,r}}$, the present disclosure can leverage the fact that each of the $a^{l,r}$ s can be factored out in the inner product:

$$(X, a^{1,r} \circ \ldots \circ a^{M,r}) = (a^{l,r})^T \varphi^{l,r}(X), \quad (19)$$

where $^T$ denotes the transpose. The j-th element of $\varphi^{l,r}(X) \in R^{d_l}$ is defined by $$[\varphi^{l,r}(X)]_j \equiv \sum_{i_1,\ldots,i_M} X_{i_1,\ldots,i_M}\delta(j, i_l)\prod_{m \neq l}a_{i_m}^{m,r}, \quad (20)$$

where $\delta(j, i_l)$ is Kronecker's delta, which takes one only if $j = i_l$, zero otherwise. Using this and $\mu^{l,r} \equiv \langle a^{l,r} \rangle$, there is $$\langle \Delta(y, X)^2 \rangle_{\backslash a^{l,r}} = \quad (21)$$
$$c. + a^{l,r T}\langle \varphi^{l,r}\varphi^{l,r T}\rangle a^{l,r} - 2a^{l,r T}\langle \varphi^{l,r}\rangle\left[y - \sum_{r' \neq r}(X, \mu^{1,r'} \circ \ldots \circ \mu^{M,r'})\right],$$

where c. is a constant not including the $a^{l,r}$ and $\langle \cdot \rangle$ without subscript denotes the expectation by Q (Eq. (16)). The present disclosure dropped the subscript $_{\backslash a^{l,r}}$ on the r.h.s. because $\varphi^{l,r}$ does not include the $a^{l,r}$.

The VB equation (17) now looks like:

$$\ln q_1^{l,r}(a^{l,r}) = c. - \frac{1}{2}a^{l,r T}\left(\sum^{l,r}\right)^{-1}a^{l,r} + \lambda a^{l,r T}\Phi^{l,r}y_N^{l,r}, \text{ where} \quad (22)$$

$$\sum^{l,r} \equiv \left\{\lambda\sum_{n=1}^{N}\langle \varphi^{l,r,(n)}\varphi^{l,r,(n)T}\rangle + \langle b^{l,r}\rangle I_{d_l}\right\}^{-1}$$

$$\Phi^{l,r} \equiv [\langle \varphi^{l,r,(1)}\rangle, \ldots, \langle \varphi^{l,r,(N)}\rangle] \quad (23)$$

$$[y_N^{l,r}]_n \equiv y^{(n)} - \sum_{r' \neq r}(X^{(n)}, \mu^{1,r'} \circ \ldots \circ \mu^{M,r'}), \quad (24)$$

with $\varphi^{l,r,(n)}$ being a shorthand notation for $\varphi^{l,r}(X^{(n)})$. Thus it is concluded that $q_1^{l,r}(a^{l,r}) = N(a^{l,r}|\mu^{l,r}, \Sigma^{l,r})$ with $$\mu^{l,r} = \lambda \Sigma^{l,r}\Phi^{l,r}y_N^{l,r}. \quad (25)$$

Using this result, the present disclosure can explicitly compute $\langle \varphi^{l,r}\varphi^{l,r T}\rangle$ as $$[\langle \varphi^{l,r}\varphi^{l,r T}\rangle]_{i,j} = \sum_{i,j} X_i X_j \delta(i, i_l)\delta(j_l, j)\prod_{m \neq l}S_{i_m, j_m}^{m,r}, \quad (26)$$

$$S^{m,r} \equiv \langle a^{l,r}a^{l,r T}\rangle = \sum^{m,r} + \mu^{m,r}(\mu^{m,r})^T \quad (27)$$

where the present disclosure used the notation of $i = (i_1, \ldots, i_m)$ etc. Similarly, $\langle \varphi^{l,r}\rangle$ is given by replacing $a_{i_m}^{m,r}$ with $\mu_{i_m}^{m,r}$ in Eq. (23).

The posterior distribution the present disclosure derived (Eqs. (22) and (25)) has similarities with ordinary least squares. For $a^{l,r}$, the vector $\varphi^{l,r}$ acts as the predictor and $\Phi$ can be interpreted as the data matrix. Also, given the other $\mu^{l,r'}(r' \neq r)$, the vector $y_N^{l,r}$ represents the residual that has not been explained by the intercept and the other variables. Taking this residual as the target variable, Eq. (25) corresponds to the solution of ordinary least squares.

VE Step: Posterior for $\{b^{l,r}\}$
Now consider the second VE equation (18). Arranging the last terms of L in Eq. (14), there is $$\ln q_2^{l,r}(b^{l,r}) = c. + (\alpha^{l,r} - 1)\ln b^{l,r} - \beta^{l,r}b^{l,r},$$

$$\alpha^{l,r} \equiv \alpha_0 + \frac{1}{2}d_l \quad (28)$$

$$\beta^{l,r} \equiv \beta_0 + \frac{1}{2}\langle (a^{l,r})^T a^{l,r}\rangle \quad (29)$$

which leads to the solution $$q_2^{l,r}(b^{l,r}) = \text{Gam}(b^{l,r}|\alpha^{l,r}, \beta^{l,r}), \quad (30)$$

where Gam denotes the Gamma distribution defined in Eq. (13).

Using this the present disclosure can compute $\langle b^{l,r}\rangle$ in Eq. (22). By the basic property of the gamma distribution, $$\langle b^{l,r} \rangle = \frac{\alpha^{l,r}}{\beta^{l,r}} = \frac{d_l + 2\alpha_0}{Tr\left(\Sigma^{l,r}\right) + P\mu^{l,r}P_2^2 + 2\beta_0}, \quad (31)$$

where we have used Eq. (27) for Eq. (29).

VM Step: Point Estimation of λ

The next step of the vEM procedure is to point-estimate λ by maximizing the posterior expectation of the log complete likelihood. Formally, a task is $$VM \text{ step}: \lambda = \arg\max_\lambda \langle L(A, b, \lambda) \rangle. \quad (32)$$

To do this, the present disclosure may need an explicit representation of $\langle L(A, b, \lambda) \rangle$. Again, a challenging part is to find the expression of $\langle \Delta^2 \rangle$. In this case, the present disclosure may not need to factor out a specific $a^{l,r}$. By simply expanding the square, there is $$\langle \Delta(y, X)^2 \rangle = y^2 - 2y \sum_r \langle (X, a^{1,r} \circ \ldots \circ a^{M,r'}) \rangle +$$

$$\sum_{r,r'} \langle (X, a^{1,r} \circ \ldots \circ a^{M,r})(a^{1,r'} \circ \ldots \circ a^{M,r'}, X) \rangle =$$

$$\left\{y - \sum_r (X, \mu^{1,r} \circ \ldots \circ \mu^{M,r})\right\}^2 + \sum_r \Gamma^r(X),$$

where the present disclosure used $\langle a_{i_m}^{m,r} a_{j_m}^{m,r} \rangle = [S^{m,r}]_{i_m,j_m}$ to define $$\Gamma^r(X) \equiv (Xx_1 S^{1,r} x_2 \ldots x_M S^{M,r}, X) - (X, \mu^{1,r} \circ \ldots \circ \mu^{M,r})^2. \quad (33)$$

The condition of optimality for A is now given by $$0 = \frac{\partial \langle L \rangle}{\partial \lambda} = \frac{N}{2\lambda} - \frac{1}{2} \sum_{n=1}^N \langle \Delta(y^{(n)}, X^{(n)})^2 \rangle, \quad (34)$$

resulting in $$\lambda^{-1} = \quad (35)$$

$$\frac{1}{N} \sum_{n=1}^N \left\{y^{(n)} - \sum_{r=1}^R (X^{(n)}, \mu^{1,r} \circ \ldots \circ \mu^{M,r})\right\}^2 + \frac{1}{N} \sum_{n=1}^N \sum_{r=1}^R \Gamma^r(X^{(n)})$$

Although the multi-way nature of tensors makes things significantly complicated, this has a clear interpretation. Since $\langle A \rangle = \Sigma_{e=l}^R \mu^{1,r} \circ \ldots \circ \mu^{M,r}$, the first term is the same as the standard definition of the variance as the squared deviation from the mean. The second term comes from interactions between different modes.

Algorithm shown in Table 1 summarizes the entire vEM inference procedure, which is called in the present disclosure as the Bayesian ALS for tensor regression, as this algorithm can be viewed as a Bayesian extension of the ALS algorithm. In some embodiments, the present disclosure may fix $\alpha_0=1$, $\beta_0=10^{-6}$ so the prior becomes near non-informative. The rank R is virtually the only input parameter but picking an optimal R from 1, 2, 3, . . . is much easier than determining real-valued regularization parameters. For implementation, the present disclosure may use a few tensor algebraic methods. The total complexity of the algorithm depends on the formulas to use and there is a subtle trade-off among codability, efficiency, numerical stability, and memory usage.

TABLE 1

Bayesian ALS for Tensor Regression.

Input: $\{(y^{(n)}, X^{(n)})\}_{n=1}^N$, R .
Output: $\{\mu^{l,r}, \Sigma^{l,r}, \alpha^{l,r}, \beta^{l,r}\}$, λ .
Initialize: $\mu^{l,r}$ as random vector and $\langle b \rangle^{l,r}$ as 1 for $\forall (l, r)$ .
Repeat
   $\lambda^{-1} \leftarrow$ Eq. (35)
   for l ← 1, . . . , M do
     for r ← 1, . . . , R do
       $\Sigma^{l,r} \leftarrow \{\lambda \Sigma_{n=1}^N \langle \varphi^{l,r,(n)} \varphi^{l,r,(n)T} \rangle + \langle b^{l,r} \rangle I_{d_l}\}^{-1}$
       $\mu^{l,r} \leftarrow \lambda \Sigma^{l,r} \Phi^{l,r} y_N^{l,r}$
       $\beta^{l,r} \leftarrow \beta_0 + \frac{1}{2}\langle (a^{l,r})^T a^{l,r} \rangle$
     end for
   end for
until convergence In the algorithm shown in Table 1, M is the number of modes of the input tensors and is automatically determined by the setup of the system, for instance, a manufacturing system process such as semiconductor etching. For instance, in the semiconductor etching example, M can be 2, where one mode represents etching steps and the other mode represents sensors. R is an integer called the rank of the input tensor. In some embodiments, R is configurable, for example. For example, R can be a manually chosen parameter (or automatically selected based on criteria) to control the expression capacity of the model. If R is too large, the model is more susceptible to noise. If R is too small, the model will not be able to faithfully represent the real system, giving a low detection accuracy. In some embodiments, R is chosen as a positive integer less than the dimension of each mode. For example, in the semiconductor etching example, R can take an integer of less than 10 for a system whose number of sensors is on the order of 100 and the number of etching steps is on the order of 20.

Relationship with classical ALS

In this section, the following proposition is disclosed:
Proposition 1 the Classical ALS Solution is the Maximum a Posteriori (MAP) Approximation of the Bayesian ALS.

To prove this, let $b^{l,r}=\rho\lambda$ for a constant ρ. The MAP solution is the one to maximize the log likelihood with respect to $\{a^{l,r}\}$. By differentiating Eq. (14), the present disclosure may obtain the condition of optimality $$\sum_{n=1}^N \left\{y^{(n)} - \sum_{r'=1}^R (a^{l,r'})^T \varphi^{l,r',(n)}\right\} \varphi^{l,r,(n)} + \rho a^{l,r} = 0,$$

which readily gives an iterative formula:

$$\tilde{\Sigma}^{l,r} \leftarrow \left\{\sum_{n=1}^N \varphi^{l,r}(X^{(n)}) \varphi^{l,r}(X^{(n)})^T + \rho I_{d_l}\right\}^{-1} \quad (36)$$

$$a^{l,r} \leftarrow \tilde{\Sigma}^{l,r} \Phi^{l,r} y_N^{l,r}, \quad (37)$$

where the present disclosure used the same notations as the probabilistic counterpart (see Eqs. (23) and (24)). To establish the relationship with the traditional notation of ALS, the following is noted:

$$\varphi^{l,r} = X_{(l)}(a^{M,r} \otimes \ldots \otimes a^{l+1,r} \otimes a^{l-1,r} \otimes \ldots \lfloor a^{l,r}),$$

where $X_{(l)}$ is the mode-l matricization of X and $\otimes$ denotes the Kronecker product. With this identity, the present disclosure may conclude that the MAP solution is the equivalent to the classical ALS with the $\ell_2$ regularizer.

In comparison to the frequentist ALS solution, there are advantages of the Bayesian ALS. First, in the Bayesian ALS, the regularization parameter is automatically learned as part of the model. In ALS, ρ has to be cross-validated. Second, the Bayesian ALS can provide a probabilistic output, while the ALS has to resort to extra model assumptions for that. This is a limitation in many real applications, especially when applied to change analysis. Third, in the Bayesian ALS, the alternating scheme is derived as a natural consequence of the factorized assumption of Eq. (16), in which the vEM framework provides a clear theoretical foundation of the whole procedure.

Predictive Distribution

Using the learned model parameters and the posterior distribution, the present disclosure can build a predictive distribution to predict y for an unseen X. By taking the expectation of the observation model with respect to $a^{l,r}$, the predictive distribution is given by $$p(y|x, D) = \int \prod_{l,r} da^{l,r} q_1^{l,r}(a^{l,r}) N(y | (X, A), \lambda^{-1}).$$

Due to the intermingled form of different modes, the exact integration may be not possible despite the seeming linear Gaussian form. However, the present disclosure can derive an approximated result in the following way. First, pick an arbitrary (l', r'), and use the factored form Eq. (19). By performing integration with respect to $a^{l',r'}$, there is $$\int da^{l',r'} q_1^{l',r'}(a^{l',r'}) N(y|(X,A),\lambda^{-1}) = N(y|\mu^{l',r'T} \varphi^{l',r'}, \lambda^{-1} + \varphi^{l',r'T} \Sigma^{l',r'} \varphi^{l',r'}). \quad (38)$$

To proceed to a next (l", r"), factoring out the $a^{l'',r''}$ form $\varphi^{l',r'}$ is needed. The problem is that the variance is a complex function of $a^{l'',r''}$ and analytic integration may be not possible in the second step and on. Here, as an approximation, the present disclosure may replace the variance with $\lambda^{-1} + \text{Tr}(\Sigma^{l',r'} \langle \varphi^{l',r'} \varphi^{l',r'T} \rangle)$ and take account of the dependency of $a^{l'',r''}$ only in the mean. See Eqs. (26) and (27) for an explicit expression of $\langle \varphi^{l',r'} \varphi^{l',r'T} \rangle$.

In this way, the present disclosure may obtain the predictive distribution as $$p(y|x, D) = N(y|\mu(X), \sigma^2(X)) \text{ with} \quad (39)$$

$$\mu(X) = \eta + \sum_{r=1}^{R}(X, \mu^{1,r} \circ \ldots \circ \mu^{M,r}), \quad (40)$$

$$\sigma^2(X) = \lambda^{-1} + \sum_{r=1}^{R}\sum_{l=1}^{M} Tr\left(\sum_{l,r} \langle \varphi^{l,r} \varphi^{l,r T} \rangle\right), \quad (41)$$

where η is to offset non-centered testing data. If the present disclosure denotes the sample average of y and X over raw training samples by y and $\bar{X}$, respectively, η is given by $y - \Sigma_r(\bar{X}\mu^{1,r} \circ \ldots \circ \mu^{M,r})$. Notice that $\langle \varphi^{l',r'} \varphi^{l',r'T} \rangle$ depends on the input tensor X. Unlike the GPR-based tensor regression methods, the present disclosure do not need any heavy computations of CP or Tucker decomposition upon testing in one embodiment.

The problem of tensorial change analysis is new and existing methods are not directly comparable to the change analysis part. The following discussion shows the practical utility of the proposed Bayesian ALS (BALS) framework in computing mode-wise change analysis scores. BALS includes probabilistic tensor regression as a major component. Since a Gaussian-based probabilistic tensor regression method can compute the change score with Eq. (8), the present disclosure also compares BALS with alternatives on the change score and other basic metrics. In the present context, in one aspect, two GPR-based models are relevant to BALS. One is based on the naive Gaussian kernel $e^{-PX - X'P_F^2/\sigma^2}$, which the present disclosure calls n-GPR. The other is based on the state-of-the-art mode-wise kernel decomposition: $\Pi_{l=1}^{M} e^{-D(X_{(l)}, X_{(l)}')/\sigma^2}$, which the present disclosure calls d-GPR. Here $D(\bullet, \bullet)$ a distance function between the mode-l matricized tensors. In BALS, the present disclosure uses an approximation equivalent to that of Eq. (41) in evaluating λ and $\Sigma^{l,r}$ for numerical stability.

Prediction Error and Computational Cost

To show general features of BALS in comparison to the alternatives, the present disclosure included generating synthetically generated mode-3 (M=3) tensor data in $(d_1, d_2, d_3)$= (10,8,5) with a given set of the coefficients and randomly generated covariance matrices. To simulate heavy fluctuations in the real-world, the present disclosure included adding a t-distributed noise to a vectorized representation and generated 500 samples. In the experimental runs, both accuracy and computational efficiency were achieved with the methodology of the present disclosure in embodiments.

Semiconductor Etching Diagnosis

In one aspect, the proposed Bayesian ALS method was implemented for a change analysis task for semiconductor etching as illustrated in FIG. 2. In an example experiment, the training dataset included about 1000 samples from a reference period. The testing dataset has 1372 pairs of a 35 (variables)×14 (steps) tensor and a scalar performance metric, and it includes an excursion event towards the end. The last 372 samples was considered to be anomalous. The true root cause is unknown. Change detection identified increase of change values toward the end. The change analysis score computed by Eq. (10), showed a dominant contribution of the variable $x_{12}$ and the third step. A raw signal of $x_{12}$ in the third step has a recognizable increase in the amplitude of fluctuation towards the end, suggesting a potential root cause of the excursion event.

A tensorial change analysis framework based on a probabilistic tensor regression algorithm can compute change scores for individual tensor modes and dimensions in an information-theoretic fashion, providing useful diagnostic information, for instance, in semiconductor manufacturing. The present disclosure, in one aspect, provides for variational Bayesian formulation of probabilistic tensor regression and information-theoretic formulation of tensorial change analysis in the supervised setting.

Figure 11:
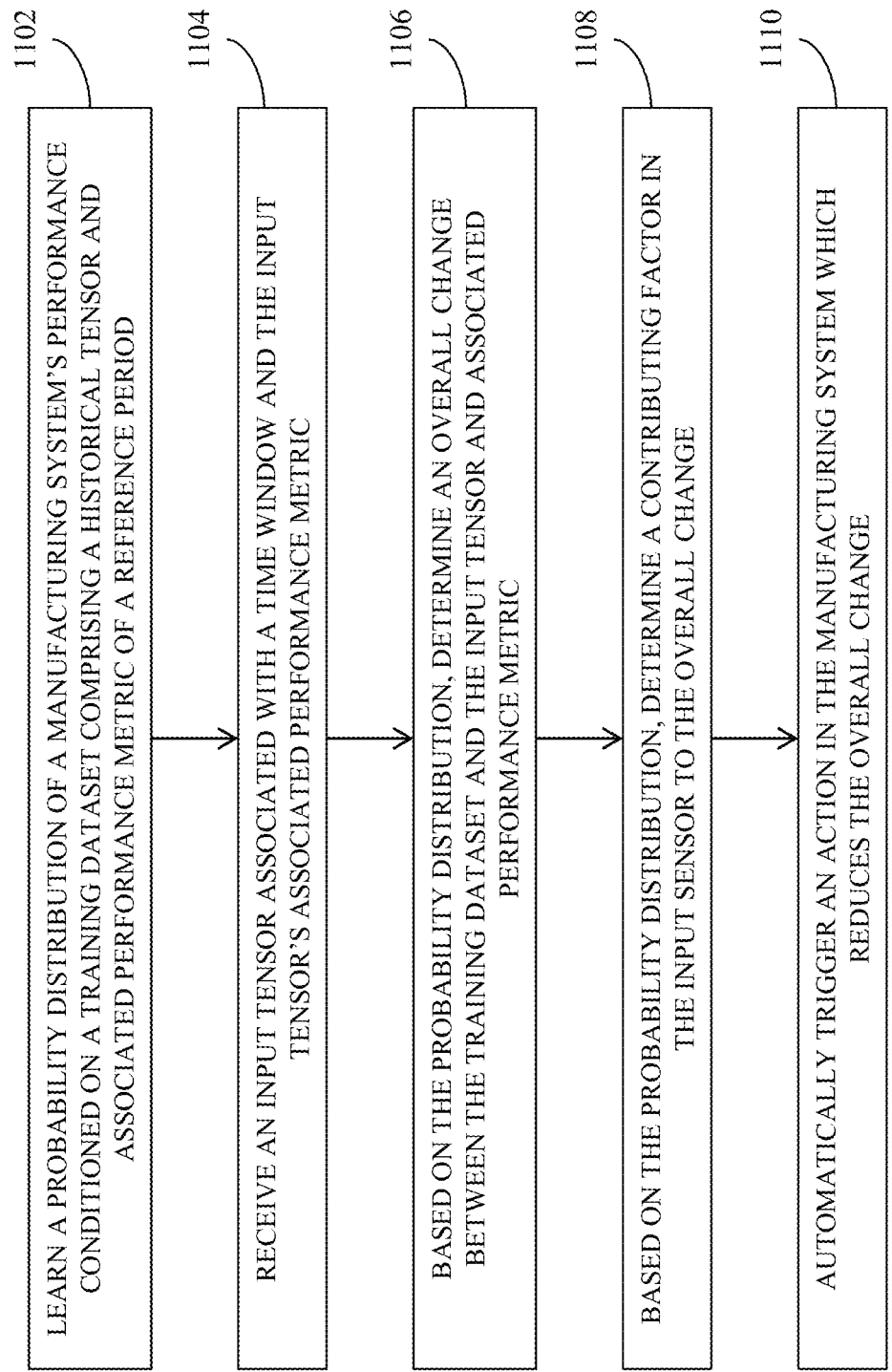
FIG. 11 is a flow diagram illustrating a computer-implemented method in one embodiment.

FIG. 11 is a flow diagram illustrating a computer-implemented method in one embodiment. A training dataset, which includes a historical tensor and associated performance metric of a reference period may be received. The historical tensor includes multiple sensor data in multiple dimensions (e.g., multiple steps) of a manufacturing process. At 1102, the method may include learning a probability distribution of a manufacturing system's performance conditioned on a training dataset, which includes a historical tensor and associated performance metric of a reference period.

At 1104 an input tensor associated with a time window and the input tensor's associated performance metric may be received. The input tensor includes at least multiple sensor variables associated with the manufacturing system and multiple steps associated with the manufacturing system's manufacturing process.

At 1106, based on the probability distribution, an overall change is determined between the training dataset's relationship of the historical tensor and associated performance metric, and the relationship of the input tensor and the input tensor's associated performance metric, for instance, as described in detail above.

At 1108, based on the probability distribution, a contribution of at least one of the multiple variables and the multiple steps to the overall change is determined, for instance, as described in detail above. In one aspect, determining the contribution includes computing a responsibility score of each of the multiple variables and the multiple steps, with respect to the overall change. In one aspect, a Kullback-Leibler divergence between the probability distribution of the training dataset and the input tensor associated with the time window and the input tensor's associated performance metric may be implemented to determine the contribution.

At 1110, an action is automatically triggered or executed in the manufacturing system which reduces the overall change. In one aspect, the action is automatically triggered responsive to the overall change meeting a threshold value. In one aspect, the action may be a generic maintenance action, which is automatically, for instance, without needing to classify particular responsibility score of individual variables or steps. In another aspect, an action may be based on the contribution associated with one or more of the multiple variables and the multiple steps. For instance, a database comprising fault entries may be searched (where each fault entry may include a fault identifier, a reference signature and a maintenance action) for a match between the reference signature and a signature associated with one or more of the multiple variables and the multiple steps which contributed to the overall change. The maintenance action associated with the reference signature that matched may be automatically triggered.

In one aspect, the method shown in FIG. 11 is implemented in an automated online maintenance tool monitoring the manufacturing system in real-time. For instance, the input tensor may be received in real-time in increments of time windows, as the sensor data and the steps occur.

Figure 12:
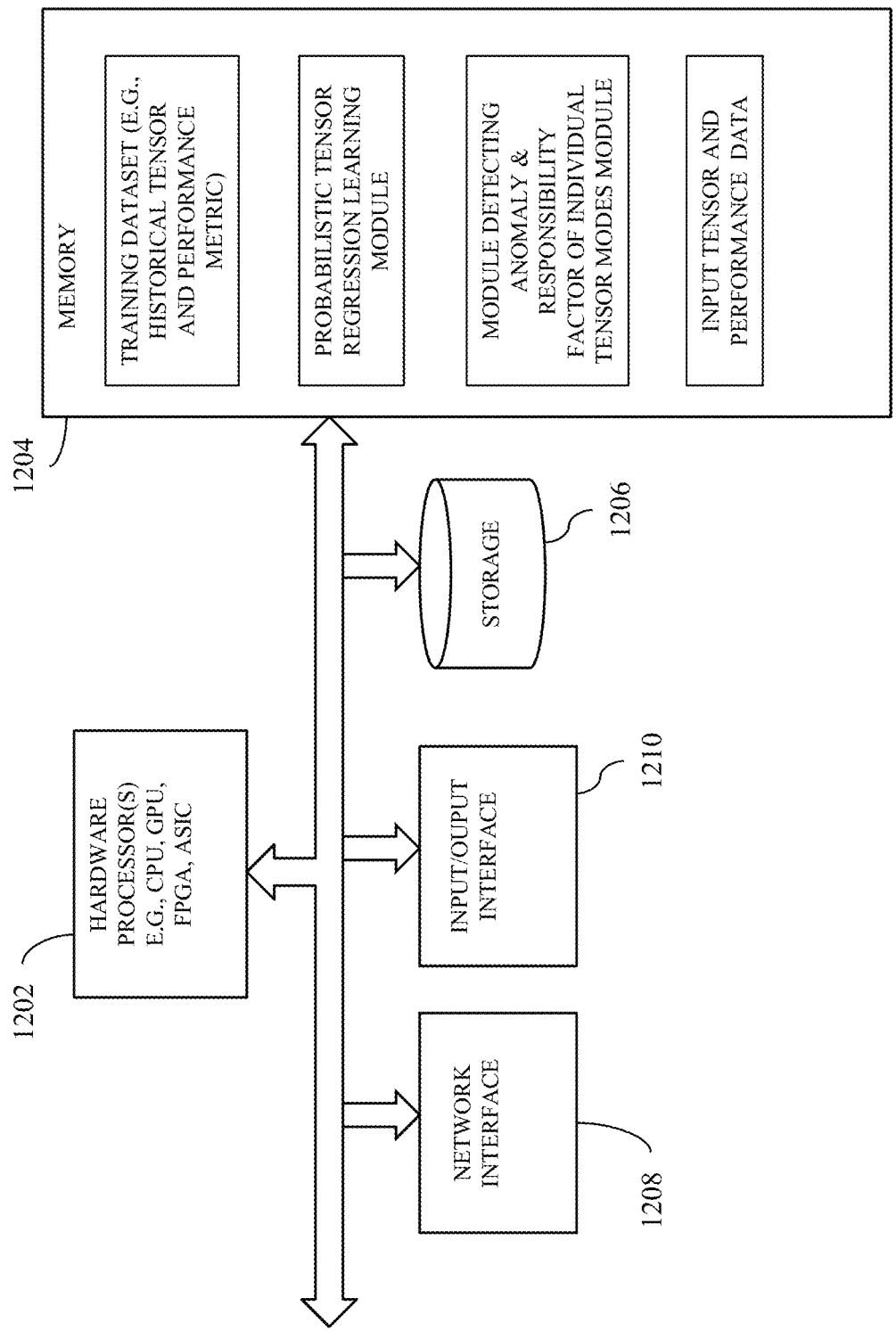
FIG. 12 is a diagram showing components of a system in one embodiment, which may perform change diagnosis based on probabilistic tensor regression.

FIG. 12 is a diagram showing components of a system in one embodiment, which may perform change diagnosis based on probabilistic tensor regression. In some embodiments, a module to learn a probabilistic tensor regression model from a training dataset may implement a probabilistic tensor regression method. Another module may compute the anomalousness of a system being monitored (e.g., a manufacturing system) and responsibility factors of individual tensor modes. This module may use the posterior distribution on the mode-decomposed regression coefficients in an information-theoretic fashion for non-subjective scoring.

One or more hardware processors 1202 such as a central processing unit (CPU), a graphic process unit (GPU), and/or a Field Programmable Gate Array (FPGA), an application specific integrated circuit (ASIC), and/or another processor, may be coupled with a memory device 1204, and generate a prediction model, recommend, trigger or execute an action on the manufacturing system. One or more hardware processors 1202 may be, for example, coupled to a manufacturing controller which receives and or monitors sensors in the manufacturing system. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 1204 may, for example, store instructions and/or data for functioning of the one or more hardware processors 1202, and may include an operating system and other program of instructions and/or data. The one or more hardware processors 1202 may receive input comprising tensor data. For instance, at least one hardware processor 1202 may learn a probability distribution of the manufacturing system's performance conditioned on a training dataset comprising a historical tensor and associated performance metric of a reference period. At least one hardware processor 1202 may receive an input tensor associated with a time window and the input tensor's associated performance metric. The input tensor may include at least multiple sensor variables associated with the manufacturing system and multiple steps of the manufacturing system's manufacturing process. Based on the probability distribution, at least one hardware processor 1202 may determine an overall change between the training dataset's relationship of the historical tensor and associated performance metric, and the relationship of the input tensor and the input tensor's associated performance metric. Based on the probability distribution, at least one hardware processor 1202 may determine a contribution of at least one of the multiple variables and the multiple steps to the overall change. At least one hardware processor 1202 may automatically trigger an action in the manufacturing system which reduces the overall change.

In one aspect, tensor data may be stored in a storage device 1206 or received via a network interface 608 from a remote device, and may be temporarily loaded into the memory device 1204 for processing. The learned probability model may be stored on memory 1204, for example, for execution by one or more hardware processors 1202. The one or more hardware processors 1202 may be coupled with interface devices such as a network interface 1208 for communicating with remote systems, for example, via a network, and an input/output interface 1210 for communicating with input and/or output devices such as a keyboard, mouse, display, and/or others.

FIG. 13 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 13 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    learning a probability distribution of a manufacturing system's performance conditioned on a training dataset comprising a historical tensor and associated performance metric of a reference period;
    receiving an input tensor associated with a time window and the input tensor's associated performance metric, the input tensor comprising at least multiple sensor variables associated with the manufacturing system and multiple steps of the manufacturing system's manufacturing process;
    based on the probability distribution, determining an overall change between the training dataset's relationship of the historical tensor and associated performance metric, and the relationship of the input tensor and the input tensor's associated performance metric;
    based on the probability distribution, determining a contribution of at least one of the multiple variables and the multiple steps to the overall change; and
    automatically triggering an action in the manufacturing system which reduces the overall change,
    wherein the determining of the contribution comprises implementing a Kullback-Leibler divergence between the probability distribution of the training dataset and the input tensor associated with the time window and the input tensor's associated performance metric.

2. The method of claim 1, wherein the automatically triggering the action comprises triggering a maintenance action associated with the at least one of the multiple variables and the multiple steps which contributed to the overall change.

3. The method of claim 1, wherein the automatically triggering an action comprises:
    searching a database comprising fault entries, each fault entry comprising a fault identifier, a reference signature and a maintenance action, for a match between the reference signature and a signature associated with the at least one of the multiple variables and the multiple steps which contributed to the overall change; and
automatically triggering the maintenance action associated with the reference signature that matched.

4. The method of claim 1, wherein the automatically triggering an action comprises:
automatically executing a generic maintenance action.

5. The method of claim 1, wherein the method is implemented in an automated online maintenance tool monitoring the manufacturing system in real-time.

6. The method of claim 1, wherein the action is automatically triggered responsive to the overall change meeting a threshold value.

7. A system comprising:
at least one hardware processor coupled with a manufacturing controller receiving sensor data associated with a manufacturing system;
a memory coupled with the at least one hardware processor;
the at least one hardware processor operable to at least:
learn a probability distribution of the manufacturing system's performance conditioned on a training dataset comprising a historical tensor and associated performance metric of a reference period;
receive an input tensor associated with a time window and the input tensor's associated performance metric, the input tensor comprising at least multiple sensor variables associated with the manufacturing system and multiple steps of the manufacturing system's manufacturing process;
based on the probability distribution, determine an overall change between the training dataset's relationship of the historical tensor and associated performance metric, and the relationship of the input tensor and the input tensor's associated performance metric;
based on the probability distribution, determine a contribution of at least one of the multiple variables and the multiple steps to the overall change; and
automatically trigger an action in the manufacturing system which reduces the overall change,
wherein the hardware processor determines the contribution by implementing a Kullback-Leibler divergence between the probability distribution of the training dataset and the input tensor associated with the time window and the input tensor's associated performance metric.

8. The system of claim 7, wherein the hardware processor automatically triggers the action comprising a maintenance action associated with the at least one of the multiple variables and the multiple steps which contributed to the overall change.

9. The system of claim 7, wherein the hardware processor automatically triggers the action by searching a database comprising fault entries, each fault entry comprising a fault identifier, a reference signature and a maintenance action, for a match between the reference signature and a signature associated with the at least one of the multiple variables and the multiple steps which contributed to the overall change, the hardware processor automatically triggering the maintenance action associated with the reference signature that matched.

10. The system of claim 7, wherein the hardware processor automatically triggers the action by automatically executing a generic maintenance action.

11. The system of claim 7, wherein the hardware processor implements an automated online maintenance tool monitoring the manufacturing system in real-time.

12. The system of claim 7, wherein the action is automatically triggered responsive to the overall change meeting a threshold value.

13. A computer program product comprising a computer readable storage medium having program instructions embodied therewith, wherein the computer readable storage medium is not a transitory signal per se, the program instructions readable by a processor to cause the processor to perform a method comprising:
learning a probability distribution of a manufacturing system's performance conditioned on a training dataset comprising a historical tensor and associated performance metric of a reference period;
receiving an input tensor associated with a time window and the input tensor's associated performance metric, the input tensor comprising at least multiple sensor variables associated with the manufacturing system and multiple steps of the manufacturing system's manufacturing process;
based on the probability distribution, determining an overall change between the training dataset's relationship of the historical tensor and associated performance metric, and the relationship of the input tensor and the input tensor's associated performance metric;
based on the probability distribution, determining a contribution of at least one of the multiple variables and the multiple steps to the overall change; and
automatically triggering an action in the manufacturing system which reduces the overall change,
wherein the determining of the contribution comprises implementing a Kullback-Leibler divergence between the probability distribution of the training dataset and the input tensor associated with the time window and the input tensor's associated performance metric.

14. The computer readable storage medium of claim 13, wherein the automatically triggering the action comprises triggering a maintenance action associated with the at least one of the multiple variables and the multiple steps which contributed to the overall change.

15. The computer readable storage medium of claim 13, wherein the automatically triggering an action comprises:
searching a database comprising fault entries, each fault entry comprising a fault identifier, a reference signature and a maintenance action, for a match between the reference signature and a signature associated with the at least one of the multiple variables and the multiple steps which contributed to the overall change; and
automatically triggering the maintenance action associated with the reference signature that matched.

16. The computer readable storage medium of claim 13, wherein the automatically triggering an action comprises:
automatically executing a generic maintenance action.

17. The computer readable storage medium of claim 13, wherein the action is automatically triggered responsive to the overall change meeting a threshold value.

* * * * *